United States Patent
Chapelain et al.

(10) Patent No.: US 7,677,131 B2
(45) Date of Patent: Mar. 16, 2010

(54) GEAR ARRANGEMENT

(75) Inventors: Etienne Chapelain, Migne-Auxances (FR); Laurent Groleau, Latille (FR)

(73) Assignee: Autoliv Development AB, Vargarda (SE)

( * ) Notice: Subject to any disclaimer, the term of this patent is extended or adjusted under 35 U.S.C. 154(b) by 405 days.

(21) Appl. No.: 10/591,772

(22) PCT Filed: Feb. 25, 2005

(86) PCT No.: PCT/SE2005/000264

§ 371 (c)(1),
(2), (4) Date: Sep. 6, 2006

(87) PCT Pub. No.: WO2005/087569

PCT Pub. Date: Sep. 22, 2005

(65) Prior Publication Data

US 2007/0186717 A1 Aug. 16, 2007

(30) Foreign Application Priority Data

Mar. 11, 2004 (GB) ................... 0405496.1

(51) Int. Cl.
*B62D 1/04* (2006.01)
*B62D 1/10* (2006.01)
*F16H 55/18* (2006.01)

(52) U.S. Cl. .................. 74/492; 74/484 R; 74/498; 74/409; 74/440; 74/445

(58) Field of Classification Search ............. 74/404, 74/440, 492, 498, 409, 444, 445, 411, 484 R
See application file for complete search history.

(56) References Cited

U.S. PATENT DOCUMENTS

| 1,317,232 | A | * | 9/1919 | Spillman | 74/440 |
| 1,486,423 | A | * | 3/1924 | Ericson | 74/440 |
| 1,564,160 | A | * | 12/1925 | Wegert | 74/440 |
| 2,092,888 | A | * | 9/1937 | Maccoul | 74/440 |
| 2,206,831 | A | * | 7/1940 | Berthelsen | 74/440 |
| 2,311,902 | A | * | 2/1943 | Roethel et al. | 74/440 |
| 3,127,784 | A |   | 4/1964 | O'Neill | |
| 4,660,432 | A | * | 4/1987 | Damas | 74/440 |

(Continued)

FOREIGN PATENT DOCUMENTS

EP       0414245 A1     2/1991

(Continued)

*Primary Examiner*—Richard W L Ridley
*Assistant Examiner*—Thomas Diaz
(74) *Attorney, Agent, or Firm*—Harness, Dickey & Pierce, P.L.C.

(57) ABSTRACT

A steering-wheel arrangement is disclosed which comprises a steering-wheel having a first gear element. A second gear element is provided which is mounted on a steering column. The first and second gear elements inter-engage one another and the arrangement is further provided with an anti-backlash gear which is mounted on one of the gear elements. The anti-backlash gear has teeth configures to as to align substantially with the teeth of the gear element upon which it is mounted, and the anti-backlash gear is biased relative to the gear element upon which it is mounted towards a position in which the teeth of the anti-backlash gear become displaced from the corresponding teeth of the gear element. This gear arrangement has been found to provide improved "feel" for a person driving a motor vehicle.

11 Claims, 7 Drawing Sheets

U.S. PATENT DOCUMENTS

| | | | |
|---|---|---|---|
| 4,781,073 A | 11/1988 | Bondhus et al. |
| 4,796,482 A | 1/1989 | Hiramitsu et al. |
| 5,152,358 A | 10/1992 | Kozuka |
| 5,738,368 A | 4/1998 | Hammond et al. |
| 2002/0050702 A1 | 5/2002 | Aulbach |

FOREIGN PATENT DOCUMENTS

| | | |
|---|---|---|
| EP | 1174592 A1 * | 1/2002 |
| EP | 1199243 A1 | 4/2002 |
| FR | 1440124 A | 4/1966 |
| GB | 2385028 A | 8/2003 |
| JP | 05-229378 A | 9/1993 |
| JP | 2002-264749 A | 9/2002 |
| WO | WO-2004/030980 A1 | 4/2004 |

* cited by examiner

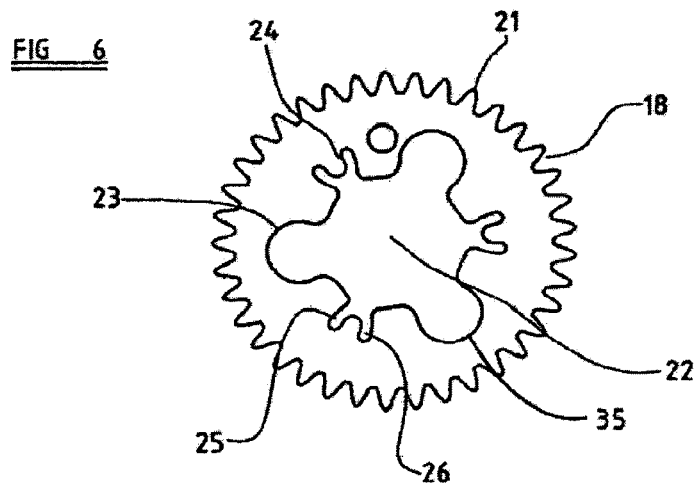
FIG 6
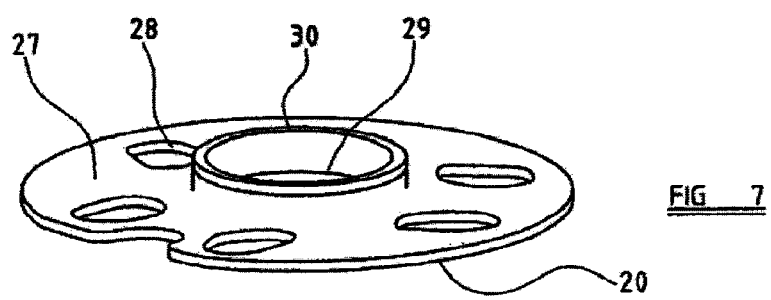
FIG 7
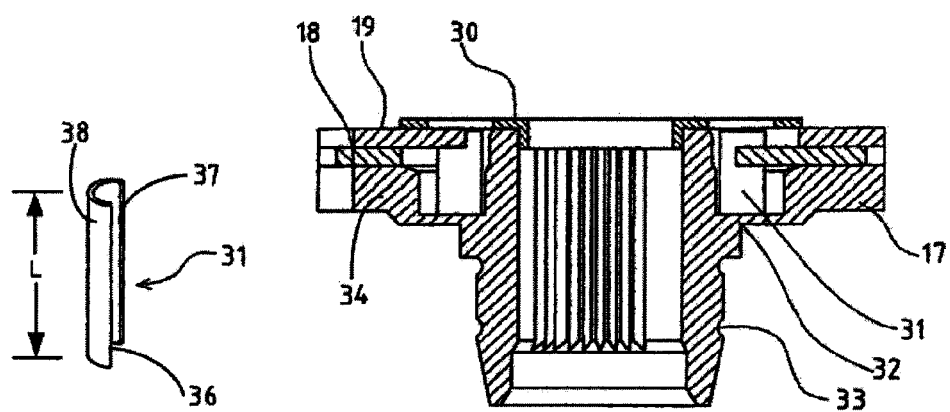
FIG 8
FIG 9

US 7,677,131 B2

GEAR ARRANGEMENT

CROSS-REFERENCE TO RELATED APPLICATIONS

This application claims the benefit and priority of UK 0405496.1, filed 11 Mar. 2004. This application is a National Stage of International Application No. PCT/SE2005/000264, filed 25 Feb. 2005. The entire disclosures of the above applications are incorporated herein by reference.

FIELD

The present disclosure relates to a gear arrangement. The gear arrangement of the invention may find a particular application in the context of a steering wheel, for example in a motor vehicle.

BACKGROUND

It has been proposed previously to provide a steering wheel unit for use in a motor vehicle. The steering wheel is mounted to rotate relative to a fixed housing. The axis about which the steering wheel rotates is offset from the axis of the steering column. The steering column carries a pinion gear. The steering wheel carries a ring gear which meshes with part of the pinion gear. As the steering wheel rotates, so the steering column is rotated.

In one embodiment of a steering wheel of this type, it is possible to mount a central air-bag unit, with the air-bag unit remaining stationary while the steering wheel rotates. This enables a specially shaped air-bag to be utilized and also facilities the mounting of control buttons or the like on the upper surface of the air-bag unit.

It has been found that with a steering wheel of this type, there may be some "play" between the pinion on the steering column and the ring gear provided on the steering wheel. This gives the steering wheel an undesirable "feel" when the motor vehicle is being driven.

SUMMARY

According to the present invention, there is provided a gear element, the gear element having a toothed portion dimensioned to engage with a co-operating gear element, the gear element having an anti-backlash gear, the anti-backlash gear having teeth corresponding to the teeth of the gear element, the anti-backlash gear being mounted to the gear element with the teeth thereof substantially in alignment with the teeth of the gear element, there being a resilient element to bias the teeth of the anti-backlash gear to a position slightly displaced from the corresponding teeth of the gear element.

Preferably, there are two anti-backlash elements, each anti-backlash element having teeth corresponding to the teeth of the gear element, the anti-backlash elements being mounted to the gear element with the teeth thereof substantially in alignment with the teeth of the gear element being biased resiliently away from each other.

According to another aspect of the present invention, there is provided a steering wheel arrangement including a steering wheel having a first gear element and a second gear element mounted on or mountable on a steering column; the first and second gear elements inter-engaging one another; the arrangement further including at least one anti-backlash gear mounted on one of the gear elements, the or each anti-backlash gear having teeth configured so as to align substantially with the teeth of the gear element upon which it is mounted, the anti-backlash gear being rotatably biased, relative to the gear element upon which it is mounted, towards a position in which the teeth of the anti-backlash gear are displaced from the corresponding teeth of the gear element.

Preferably, two of the anti-backlash gears are mounted on the gear element, the two anti-backlash gears are biased in opposite directions.

Advantageously, the gear element on which the or each anti-backlash gear is mounted is a ring gear.

Alternatively, the gear element on which the or each anti-backlash gear is mounted is a pinion gear.

Preferably, the pinion gear is provided with two anti-backlash gears, the anti-backlash gears each being in the form of a plate, each plate having an aperture therein, the aperture defining portions to engage spring elements, the apertures of the two anti-backlash gears being co-aligned and receiving spring elements.

Advantageously, each spring element is of substantially "C" shape, each spring element passing through part of the aperture in one plate which engages the spring element and part of the aperture in the other plate which accommodates the spring element.

Conveniently, part of the aperture that engages the spring element is an outwardly directed part of the aperture that is bifurcated and has two arcuate slots, each slot receiving part of the spring element, and the part of the aperture that accommodates the spring element, is of a generally arcuate outwardly directed part of the periphery of the aperture.

Preferably, the anti-backlash gears are held in position by a retaining washer.

The present invention seeks to provide an improved gear, the gear being such that it can be incorporated into a steering wheel arrangement of the type described above to improve the "feel" of the steering wheel. Of course, the gear arrangement may find many other applications.

DRAWINGS

In order that the invention may be more readily understood, and so that further features thereof may be appreciated, an embodiment of the invention will now be described, by way of example, with reference to the accompanying drawings in which:

FIG. 6 is a plan view of one anti-backlash gear;

FIG. 7 is a perspective view of the washer of FIG. 5;

FIG. 8 is a view of the spring of FIG. 5;

FIG. 9 is a sectional view of the pinion unit of FIG. 4; and

DETAILED DESCRIPTION

Figure 1:
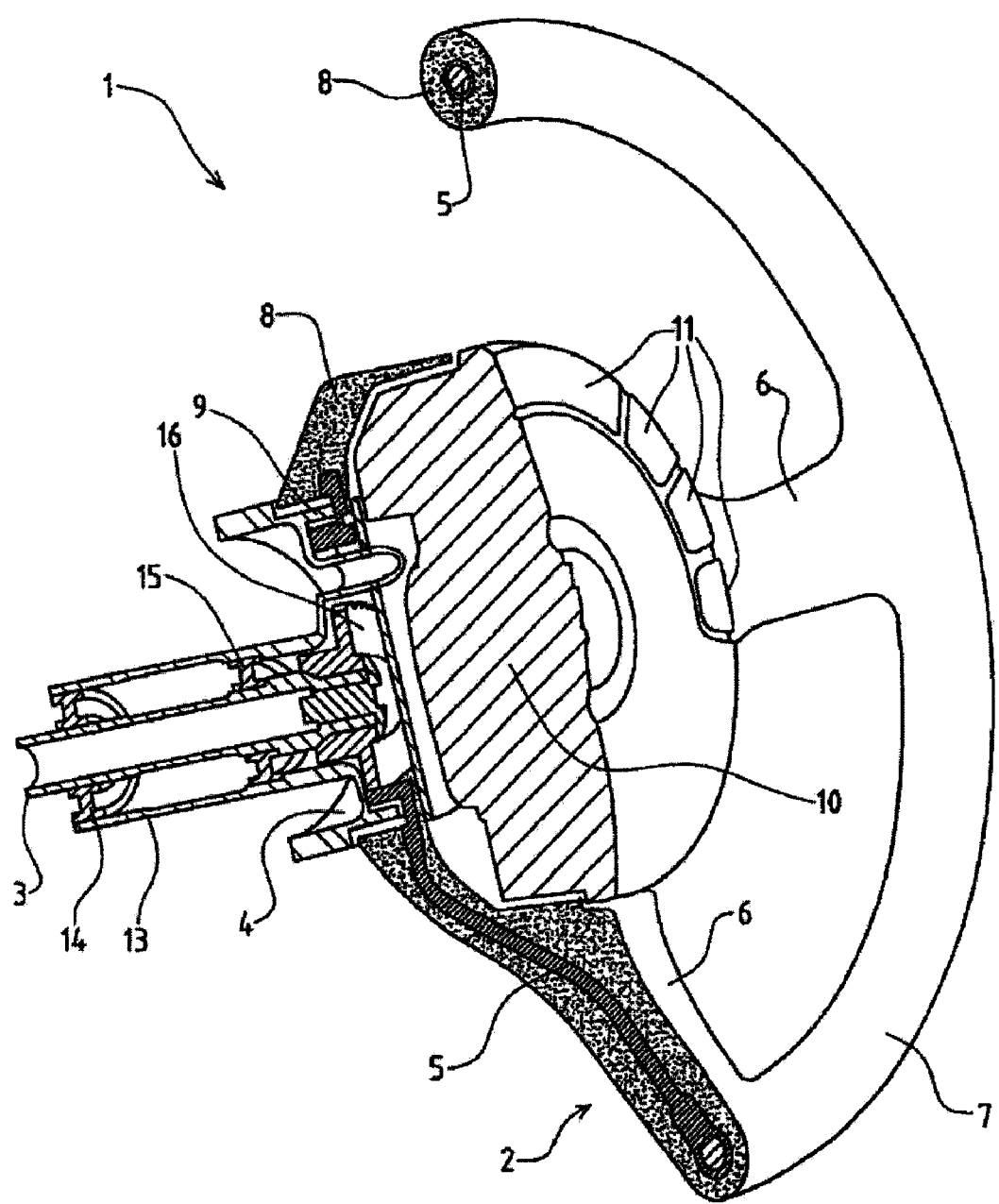
FIG. 1 is a partly perspective and partly cutaway view of a steering wheel arrangement.
Figure 2:
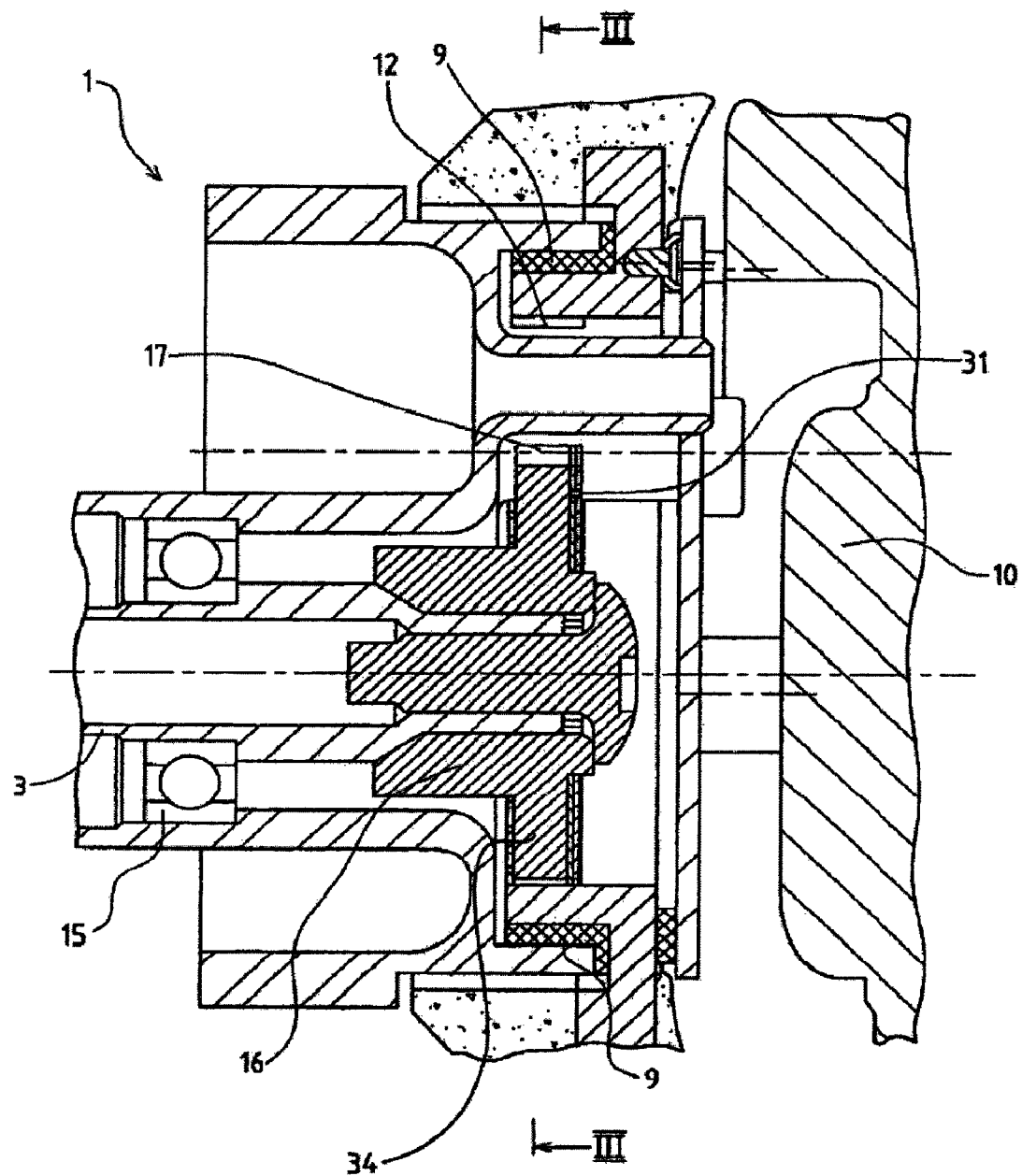
FIG. 2 is a sectional view illustrating part of a steering wheel mounting in more detail.
Figure 3:
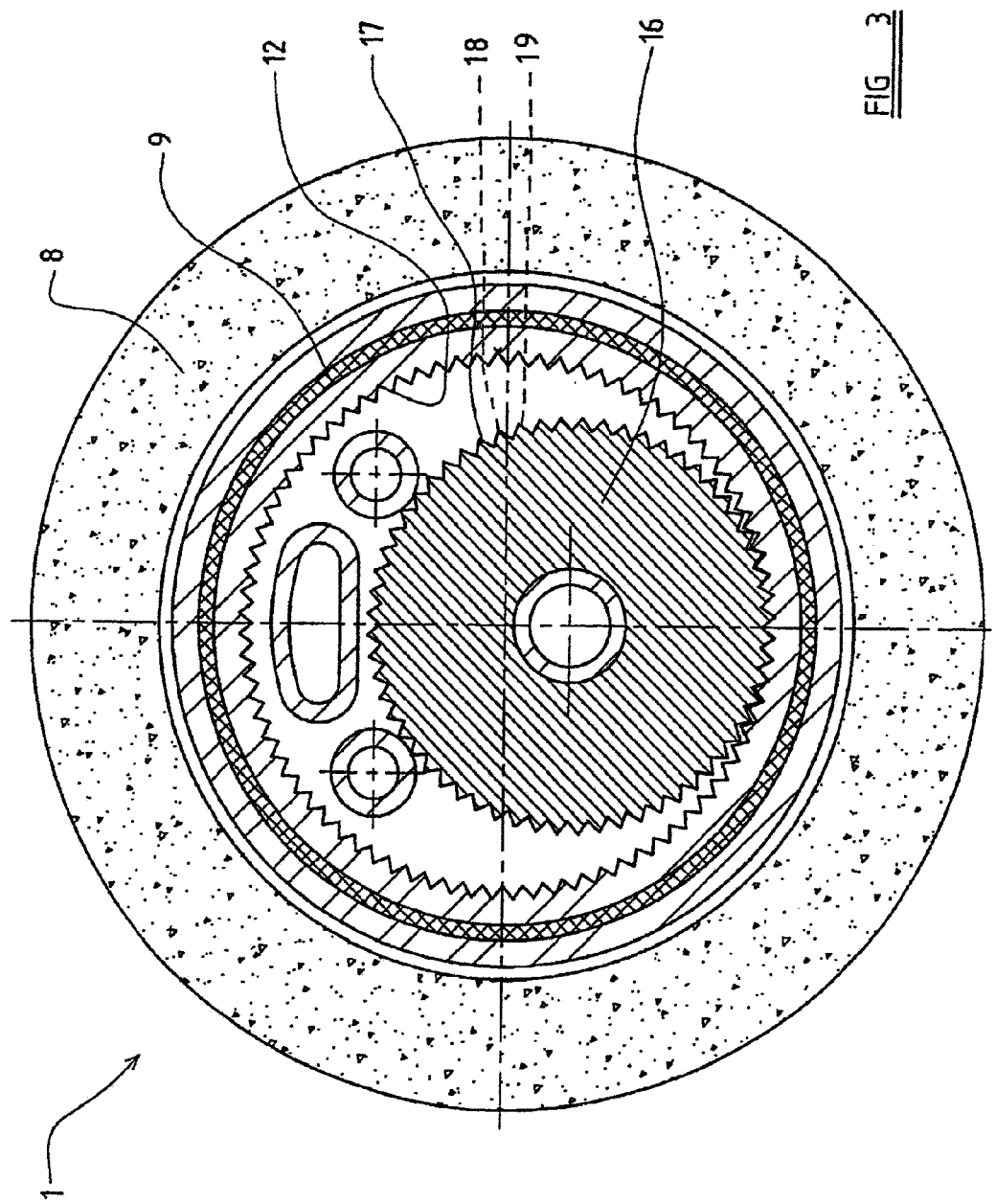
FIG. 3 is a section view taken through line 3-3 of FIG. 2.

Referring initially to FIGS. 1-3 of the accompanying drawings, a steering wheel assembly 1 incorporates a steering wheel 2 which is mounted on a steering column 3. A fixed housing 4 is provided which is securely mounted in position.

The steering wheel 2 incorporates a metallic frame 5, which defines spokes 6 and a peripheral rim 7. The frame 5 is covered with an appropriate outer covering 8, for example, of a foam material.

The frame 5 is mounted by means an annular bearing 9 on an appropriate formation provided on the housing 4. The steering wheel 2 is to rotate about a predetermined axis. An air-bag unit 10 may be provided, connected directly to the fixed housing 4. The air-bag unit 10 will, thus, not rotate on rotation of the steering wheel 2. The air-bag unit 10 may be provided with a plurality of operating buttons 11 or the like, which will be fixed in position. Part of the frame 5 adjacent the annular bearing 9 defines an inwardly facing ring gear 12.

The steering column 3 is mounted within a tubular projection 13 extending downwardly from the rest of the fixed housing 4 by means of two spaced apart bearings 14, 15 (FIG. 1). The uppermost end of the steering column 3 carries a pinion gear 16 having a toothed periphery 17 which engages with the ring gear 12 provided on the steering wheel frame 5.

It will be understood that on rotation of the steering wheel 2, the pinion 16 will rotate, thus rotating the steering column 3. A steering wheel assembly of this general type has been proposed before, and is described in EP-A-1199243. However, in the present embodiment of the invention the pinion 16 is provided with anti-backlash gears as will now be described.

Figure 4:
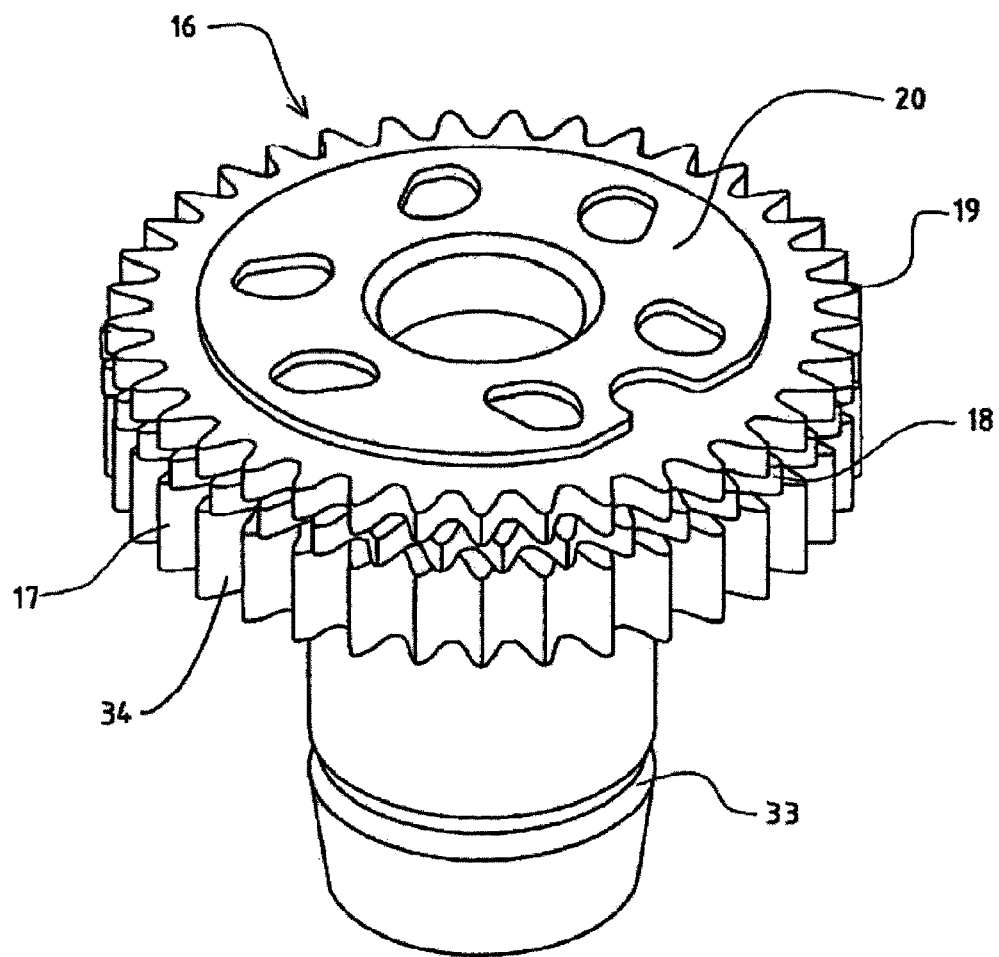
FIG. 4 is a perspective view of a pinion unit.
Figure 5:
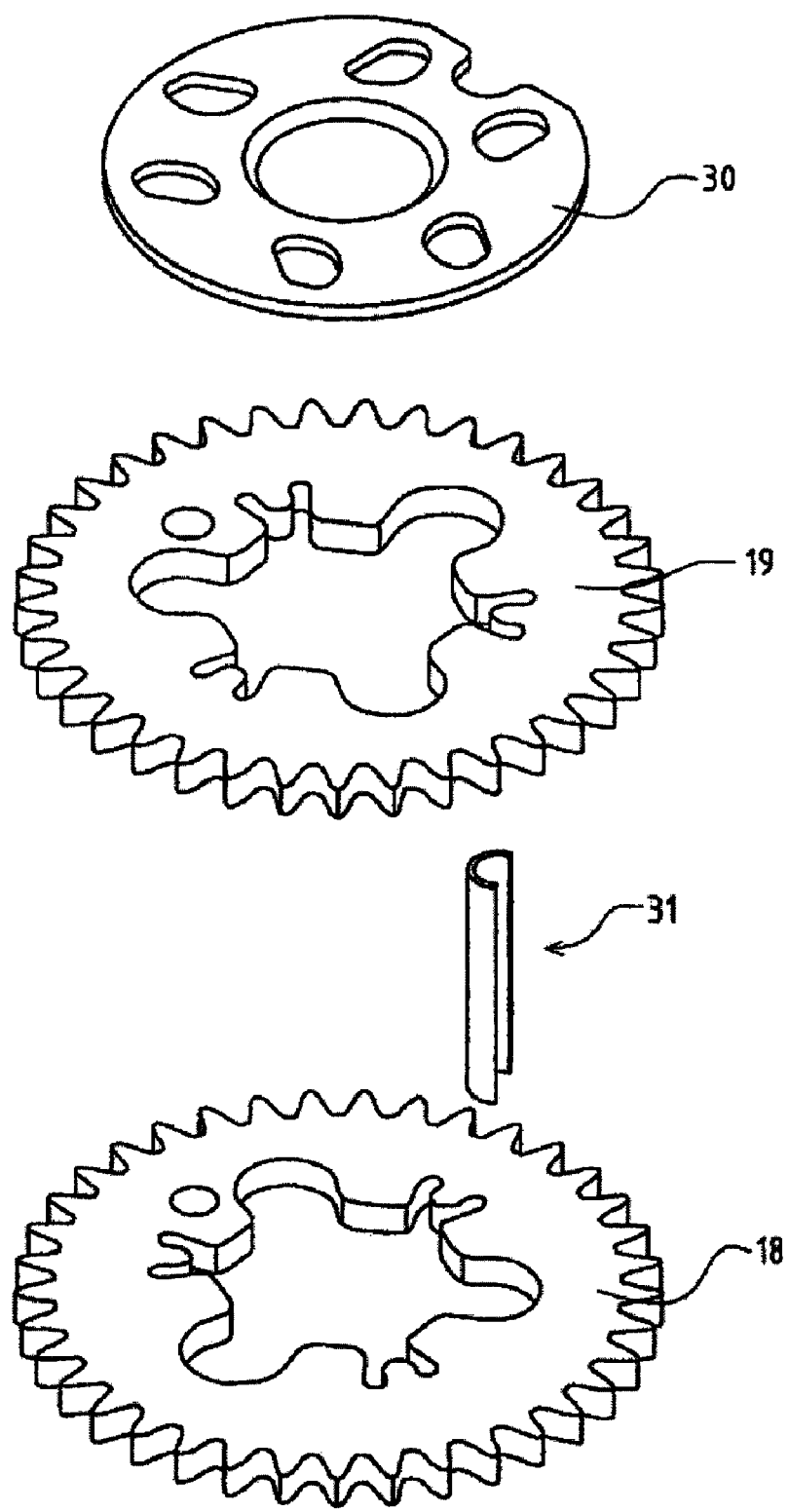
FIG. 5 is an exploded view illustrating two anti-backlash gears, a washer and a spring.

FIG. 4 is a perspective view of the pinion 16. The pinion 16 is provided with a depending portion 33 to be connected to the steering column 3 and a disc-like portion 34 provided with peripheral teeth 17. Mounted on top of the disc-like portion 34 are anti-backlash gears 18, 19, which are superimposed by a mounting washer 20.

FIG. 6 illustrates one of the anti-backlash gears 18 in more detail. Both anti-backlash gears 18, 19 are identical. However, one of the backlash gears is inverted relative to the other, so that one gear is one way up, and the other is effectively upside down. The anti-backlash gear 18 is in the form of a relatively thin plate. The plate has teeth around an outer periphery 21.

The teeth of the outer periphery 21 are identical to the peripheral teeth 17 of the pinion gear 16 itself. The teeth of the outer periphery 21 on the anti-backlash gear 18 may, in some embodiments, be slightly shorter than the teeth on the pinion gear 16, but there should be the same number of teeth on the anti-backlash gears 18, 19 as on the pinion gear 16 having the same basic width of tooth and width of gap between adjacent teeth.

The center of the anti-backlash gear 18, 19 is provided with an aperture 22 having an irregularly shaped periphery 35. The periphery 35 of the aperture 22 is provided with three equi-angularly spaced arcuate outwardly projecting recesses 23. Offset and again equi-angularly spaced, and thus located between the arcuate projecting recesses 23, are further projecting recesses 24, each of the projecting recesses 24 being bifurcated to present two arcuate outwardly extending slots 25, 26.

FIG. 7 illustrates the mounting washer 20 in more detail. The washer 20 comprises a substantially flat disc 27 provided with a plurality of apertures 28 therein. The center of the washer 20 defines an aperture 29 surrounded by an upstanding collar 30.

FIG. 8 illustrates a spring element 31, a plurality of which are used to bias the anti-backlash gears 18, 19 relative to the pinion 16. Each spring element 31 is formed from a sheet spring material, the element having a semi-circular or "C" cross-section with two opposed sides 36, 37 and having a predetermined length, L.

Each spring element 31 is dimensioned so that it may be inserted into the respective bifurcated recess 24 formed in the periphery 35 of the aperture 22, with the two opposed sides 36, 37 of the spring element 31 being received in the two arcuate slots 25, 26. Each bifurcated recess 24 will thus retain the respective spring element 31 substantially in position. Also, each spring element 31 is designed so that it may be received within an arcuate recess, such as the arcuate recess 23, with an outer profile 38 of the opposed sides 36, 37 of the spring 31 engaging opposed sides of the recess 23.

It is to be appreciated that the two anti-backlash gears 18, 19 are initially located in position one above the other, with the arcuate recesses 23 of one gear being aligned with the bifurcated recesses 24 of the other gear, and vice-versa. One gear is upside down relative to the other. The plurality of spring elements 31 may then be located in position, and a maximum of six spring elements may be used in the described embodiment, with each spring element 31 passing through co-aligned pairs of recesses 23, 24 in the adjacent anti-backlash gears 18, 19. The spring elements 31 are such that the anti-backlash gears 18, 19 are held in the superimposed position, but can move rotationally relative to each other while compressing the spring elements 31.

It is to be noted that the anti-backlash gears 18, 19, when superimposed, are relatively located so that the teeth of the two anti-backlash gears 18, 19 are slightly offset from each other.

As can be seen from FIGS. 4 and 9, the two anti-backlash gears 18, 19 are mounted on top of the pinion gear 16. The spring elements 31 have projecting ends received within an appropriate recess 32 formed in the pinion gear 16. The washer 20 overlies the anti-backlash gears 18, 19 and serves to retain the anti-backlash gears 18, 19 in position on the pinion 16.

When the anti-backlash gears 18, 19 have been mounted on the pinion gear 16, the teeth of the anti-backlash gears 18, 19 are located so that they are displaced to each side of the corresponding tooth 17 on the pinion gear 16. Thus, when the pinion gear 16 is brought into contact with the ring gear 12, the two anti-backlash gears 18, 19 will have to move relative to each other so that the teeth on all three gears 16, 18, 19 are co-aligned in order to be received between a single pair of adjacent teeth on the ring gear 12. When the pinion gear 16 and the backlash gears 18, 19 are released from this condition, the backlash gears 18, 19 will be biased apart by the spring elements 31. Thus, the anti-backlash gears 18, 19 will firmly engage the ring gear 12, there being no "play" or backlash between the ring gear 12 and the pinion gear 16. Consequently, the steering wheel 2 will have a good "feel" when the steering wheel 2 is in use.

It is to be appreciated that while in the described embodiment, two anti-backlash gears 18, 19 are provided which are biased in opposite directions relative to the pinion gear 16, an adequate effect may be obtained by providing a single backlash gear on the pinion, with that single gear being resiliently biased relative to the pinion.

Figure 10:
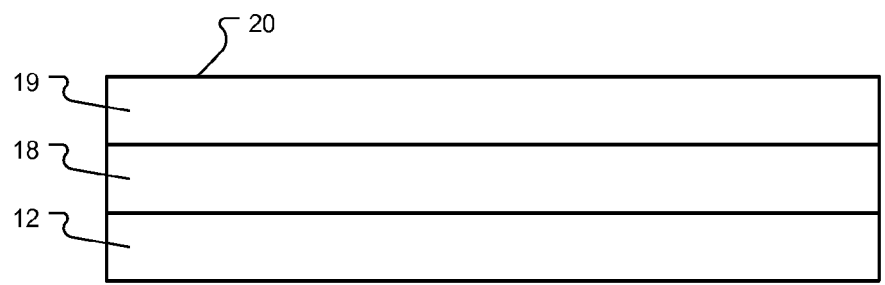
FIG. 10 is a simplified side view of a ring gear having two anti-backlash gears mounted thereto.

Again, while the invention has been described with reference to an embodiment in which the anti-backlash gears 18, 19 are provided on the pinion 16, one or more anti-backlash gear elements might be provided on the ring gear 12 as shown in FIG. 10. Of course, in such a situation the anti-backlash gears would each be of ring-gear form and the pinion would have to be dimensioned to engage not only with the ring gear, but also with the anti-backlash gears.

When used in this Specification and Claims, the terms "comprises" and "comprising" and variations thereof mean that the specified features, steps or integers are included. The terms are not to be interpreted to exclude the presence of other features, steps or components.

The invention claimed is:

1. A steering wheel arrangement comprising:
a steering wheel having a first gear element; and
a second gear element mounted on or mountable on a steering column, said first and second gear elements inter-engaging one another, the arrangement further including a first anti-backlash gear mounted directly on one of said gear elements, and a second anti-backlash gear mounted directly on said first anti-backlash gear, said first and second anti-backlash gears having teeth configured so as to align substantially with teeth of said one gear element, said first anti-backlash gear being rotatably biased relative to said one gear element towards a position in which said teeth of said first anti-backlash gear are displaced from said corresponding teeth of said one gear element, wherein said first and second anti-backlash gears are held in position by a retaining washer;
wherein said first and second anti-backlash gears are each in the form of a plate, each of said plates having an aperture therein, said aperture defining portions to engage spring elements, said apertures of said first and second anti-backlash gears being coaligned and receiving said spring elements;
wherein said spring elements are of substantially "C" shape, each of said spring elements passing through part of said aperture in one of said plates which engages said spring element, and part of said aperture in said other plate which accommodates said spring element; and
wherein said part of said aperture that engages said spring element is an outwardly directed part of said aperture that is bifurcated and has two arcuate slots, each of said slots receiving part of said spring element, and said part of said aperture that accommodates said spring element is of a generally arcuate outwardly directed part of a periphery of said aperture.

2. The steering wheel arrangement according to claim 1, wherein said first and second anti-backlash gears are biased in opposite directions.

3. The steering wheel arrangement according to claim 1, wherein said gear element on which said first anti-backlash gear is mounted is a ring gear.

4. The steering wheel arrangement according to claim 1, wherein said gear element on which said first anti-backlash gear is mounted is a pinion gear.

5. A steering wheel arrangement comprising:
a steering wheel having a first gear element; and
a second gear element mounted on or mountable on a steering column, wherein one of said gear elements is a pinion gear; said first and second gear elements inter-engaging one another; the arrangement further comprising:
two anti-backlash gears mounted on one of said gear elements,
wherein said gear element on which said anti-backlash gears are mounted is said pinion gear, each said anti-backlash gear having teeth configured so as to align substantially with teeth of said gear element upon which it is mounted,
wherein said anti-backlash gear is rotatably biased relative to said gear element upon which it is mounted towards a position in which said teeth of said anti-backlash gear are displaced from said corresponding teeth of said gear element,
wherein said anti-backlash gears each being in the form of a plate, each said plate having an aperture therein, said aperture defining portions to engage spring elements,
wherein said apertures of said two anti-backlash gears are co-aligned for receiving said spring elements of substantially "C" shape, each said spring element passing through part of said aperture in one plate which engages said spring element and part of said aperture in said other plate which accommodates said spring element,
wherein said part of said aperture that engages said spring element is an outwardly directed part of said aperture that is bifurcated and has two arcuate slots, each said slot receiving part of said spring element, and
wherein said part of said aperture that accommodates said spring element is of a generally arcuate outwardly directed part of said periphery of said aperture.

6. A steering wheel arrangement comprising:
a steering wheel including a first gear;
a steering column including a second gear meshing with said first gear;
a first anti-backlash gear directly mounted on one of said first gear and said second gear;
a second anti-backlash gear directly mounted on said first anti-backlash gear; and
a plurality of spring elements for joining said two anti-backlash gears to said one of said first gear and said second gear, wherein said first and second anti-backlash gears are rotatably biased relative to each other and to said one of said first gear and said second gear, wherein one of said first and second anti-backlash gears engages a first face of a tooth of the other of said first gear and said second gear, and the other of said first and second anti-backlash gears engages a second face of another tooth of said other of said first gear and said second gear;
wherein said plurality of spring elements are formed from a sheet spring material in a substantially "C" shape;
wherein at least one of said plurality of spring elements extends through a first aperture in said one of said first and second anti-backlash gears and through a second aperture in said other of said first and second anti-backlash gears; and
wherein one of said first and second apertures is an arcuate shape and the other of said first and second apertures is a bifurcated shape, said at least one of said plurality of spring elements including ends extending into said bifurcated shape.

7. The steering wheel arrangement of claim 6, wherein said first and second anti-backlash gears are identically configured.

8. The steering wheel arrangement of claim 7, wherein said identically configured anti-backlash gears are inverted with respect to one another.

9. The steering wheel arrangement of claim 6, further comprising a washer having a collar, said collar securing said washer to said one of said first gear and said second gear.

10. The steering wheel arrangement according to claim 6, wherein said one of said first and second gears on which said first anti-backlash gear is mounted is a ring gear.

11. The steering wheel arrangement according to claim 6, wherein said one of said first and second gears on which said first anti-backlash gear is mounted is a pinion gear.

* * * * *